(12) United States Patent
Kazachkov et al.

(10) Patent No.: US 9,432,406 B2
(45) Date of Patent: *Aug. 30, 2016

(54) SYSTEM AND METHOD FOR RESOLVING CONFLICTS BETWEEN APPLICATION CONTROL RULES

(71) Applicant: Kaspersky Lab ZAO, Moscow (RU)

(72) Inventors: Andrey V. Kazachkov, Moscow (RU); Andrey A. Pravdivy, Moscow (RU); Damir R. Shiyafetdinov, Moscow (RU)

(73) Assignee: AO Kaspersky Lab, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 14/674,693

(22) Filed: Mar. 31, 2015

(65) Prior Publication Data
US 2015/0207821 A1    Jul. 23, 2015

Related U.S. Application Data

(63) Continuation of application No. 14/557,822, filed on Dec. 2, 2014, now Pat. No. 9,032,475, which is a continuation of application No. 14/096,529, filed on Dec. 4, 2013, now Pat. No. 8,943,547.

(30) Foreign Application Priority Data

Jun. 28, 2013   (RU) .................................. 2013129544

(51) Int. Cl.
*G06F 21/57*   (2013.01)
*H04L 29/06*   (2006.01)
(Continued)

(52) U.S. Cl.
CPC ............. *H04L 63/20* (2013.01); *G06F 21/552* (2013.01); *G06F 21/57* (2013.01); *G06F 21/577* (2013.01); *G06F 21/604* (2013.01); *G06N 5/027* (2013.01)

(58) Field of Classification Search
CPC ... G06F 21/552; G06F 21/577; G06F 21/604
See application file for complete search history.

(56) References Cited

U.S. PATENT DOCUMENTS 6,466,932 B1   10/2002   Dennis et al.
6,915,285 B2    7/2005   Gray et al.
(Continued)

FOREIGN PATENT DOCUMENTS

EP    1457885 A2    9/2004
RU     101222 U1   10/2010
(Continued)

OTHER PUBLICATIONS

Comodo Internet Security (Version 5.9/5.10, Unknown Files: The Sandboxing and Scanning Processes, 2012, 3 pages).*

(Continued)

*Primary Examiner* — Saleh Najjar
*Assistant Examiner* — Oleg Korsak
(74) *Attorney, Agent, or Firm* — Arent Fox LLP; Michael Fainberg (57) ABSTRACT

Disclosed are systems, methods and computer program products for configuring application control rules. An example method includes, in response to testing a new application control rule, transmitting, from each of a plurality of computing devices in a network, information relating to software applications deployed on each computing device and one or more application control rules including the new application control rule associated with the software applications, each of the one or more application control rules having a priority, the collected information identifying at least one conflict between at least one application control rule and the new application control rule in executing one of the software applications; and receiving, by at least one of the plurality of computing devices, the new application control rule reconfigured with a lower priority to eliminate the at least one conflict.

20 Claims, 5 Drawing Sheets

(51) Int. Cl.
*G06F 21/60* (2013.01)
*G06F 21/55* (2013.01)
*G06N 5/02* (2006.01)

(56) References Cited

U.S. PATENT DOCUMENTS

| | | |
|---|---|---|
| 8,032,557 B1 | 10/2011 | Vijendra et al. |
| 8,272,025 B1 | 9/2012 | Burnham et al. |
| 2004/0177139 A1* | 9/2004 | Schuba .............. H04L 41/0873 709/223 |
| 2005/0276262 A1 | 12/2005 | Schuba et al. |
| 2006/0010439 A1 | 1/2006 | Majidian |
| 2007/0162966 A1 | 7/2007 | Agrawal et al. |
| 2008/0060080 A1 | 3/2008 | Lim |
| 2009/0049166 A1 | 2/2009 | Roman et al. |
| 2009/0327909 A1* | 12/2009 | Hayton ................ H04L 63/102 715/744 |
| 2010/0287598 A1* | 11/2010 | Korkishko .............. G06F 21/53 726/1 |
| 2011/0016091 A1* | 1/2011 | Prahlad ............... G06F 11/1453 707/654 |
| 2011/0289585 A1* | 11/2011 | Zaitsev ............... G06F 11/3051 726/24 |
| 2012/0054163 A1 | 3/2012 | Liu et al. |
| 2012/0124639 A1 | 5/2012 | Shaikh et al. |
| 2013/0097318 A1* | 4/2013 | Gladstone ............. H04L 63/107 709/226 |

FOREIGN PATENT DOCUMENTS

| | | |
|---|---|---|
| RU | 2405198 C2 | 11/2010 |
| WO | 2007088510 A1 | 8/2007 |

OTHER PUBLICATIONS

Agrawal et al., (Policy-Based Management of Networked Computing Systems, RC23685 (W0508-019) Aug. 2, 2005, 8 pages).*
Microsoft Corporation (AppLocker Policies Deployment Guide, Published: Apr. 2011).
Microsoft Corporation (BETA CONTENT: Planning and Deploying Windows AppLocker Policies, 2009)

* cited by examiner

New/Existing application control rule «Name of the rule»

| Application | Categories of Applications | User Records | Computer | Verdict |
|---|---|---|---|---|
| Application 1 | Category 1 | User 1,2,3,4 | PC1, PC2, PC3, PC4 | Blocked |
| Application 2 | Category 3 | User 2, 12,13 | PC2, PC12, PC13, PC17 | Blocked |
| Application 3 | Category 6 | User 3, 12, 14,21 | PC1, PC3, PC12, PC14, PC21, PC22 | Blocked |
| ... | ... | ... | ... | ... |

Fig. 3A

New/Existing application control rule «Name of the rule»

| User Records | Applications | Categories of Applications | Computer | Verdict |
|---|---|---|---|---|
| User 1 | Application 1, 5, 12 | Category 1 | PC3 | Blocked |
| User 2 | Application 2, 6, 7, 32 | Category 3 | PC2, PC12 | Blocked |
| User 3 | Application 13, 14 | Category 1, 6 | PC22 | Blocked |
| ... | ... | ... | ... | ... |

SYSTEM AND METHOD FOR RESOLVING CONFLICTS BETWEEN APPLICATION CONTROL RULES

CROSS-REFERENCE TO RELATED APPLICATIONS

This application is a continuation of U.S. application Ser. No. 14/557,822 filed Dec. 2, 2014, which is a continuation of U.S. application Ser. No. 14/096,529 filed Dec. 4, 2013, which claims benefit of priority under 35 U.S.C. 119(a)-(d) to a Russian Application No. 2013129544 filed on Jun. 28, 2013, both of which are incorporated by reference herein.

TECHNICAL FIELD

The present disclosure generally relates to the field of computer security, and specifically to systems, methods and computer program products for testing application control rules and automatically reconfiguring conflicting application control rules.

BACKGROUND

Maintaining a computer network is essential to operation of modern corporations. One of the benefits of having a corporate network is the possibility of rapid exchange of information between company employees by means of personal computers (hereinafter, PCs) connected to the network. It should also be noted that the corporate network and its network infrastructure form a complex system and require professional administrative to minimize malfunctions of the network infrastructure and solve the most difficult problems. What is more, the corporate network may be vulnerable to harmful attacks, which, if successful, may infect all PCs in the network with malware. Such incidents reduce the performance of the users of the network until such time as the fault in the operation of the PC caused by the infection is corrected. This circumstance causes a loss of work time of the users of all PCs of the network. Furthermore, an unprotected state of a corporate network may also lead to a leakage of commercial secrets from the company or even financial resources. It is therefore very important to exercise control over the PCs in the network, and especially over the applications that are installed and that run on the PCs in the corporate network, making possible the utmost protection for the corporate network against harmful attacks and various leaks of confidential information to the outside world. For these purposes, an "application control" technology is has been created.

There are different approaches to controlling the starting of a software program (hereinafter, software or application) that are carried out by application control systems. Typically, the control is performed using a list of application control rules that control the access or the activation of an application or a group of applications. One of the common and simplified control methods is one in which control rules permit execution of any application that is not present on a list of forbidden (e.g., blacklist) applications that has been previously created by the administrator of the corporate network. Another approach is to form the control rules such that they only permit the execution of permitted applications, and forbid all others (this approach is known as "default deny"). Typically, present-day application control systems make it possible to perform both of these methods, depending on the tasks of the administrator.

Furthermore, for the convenience of control and administrative of the users in the network, the users can be combined into groups or assigned different roles that will characterize the user's authority, their ability to use any particular application on any particular PC in the network, or access to any confidential information. For example, the role of "engineer" presumes the need to use a CAD (computer-aided design) application, such as Solid Works, in the work of the user, which application is not needed by a user with the role of "accountant" when carrying out their job responsibilities. Yet another feature of modern application control systems may be the use of categorization and inventory techniques to create and fine-tune the control rules depending on the needs of each user and the security policy of the company.

Accordingly, for a more flexible and diversified application control, every application may be assigned a category, and the user is assigned a corresponding role, which will then be used to generate the application control rules. The categorization can be done either by using previously created category templates (such as those established by the company or person developing the application control system), which contain information on different categories of applications, or by using categories generated by the administrator of the corporate network. The principle for generating the categories can be based on different criteria: the location of the application files being executed, the developer of the software, its purpose, and so on. Accordingly, a collection of categories may be formed, on the basis of which application control rules are created which also satisfy the security policy of the network. But with this approach, there is the risk of conflicts in the working of the existing application control rules and new application control rules. There is also the risk that an application control rule that is created will deliver the wrong verdicts. This is due to the fact that applications can end up either in one existing application category or in several at once, and consequently will trigger different application control rules. Furthermore, the administrator might not know which applications are forbidden or permitted to a particular network user. Hence, the rule might be generated or configured to forbid what is permitted to a user, or permit what is forbidden.

Therefore, there is a need to improve operation of modern application control systems by eliminating conflicts between new and existing application control rules.

SUMMARY

Disclosed are systems, methods and computer program products for configuring application control rules. In one aspect, an example method includes, in response to testing a new application control rule, transmitting, from each of a plurality of computing devices in a network, information relating to software applications deployed on each computing device and one or more application control rules including the new application control rule associated with the software applications, each of the one or more application control rules having a priority, the collected information identifying at least one conflict between at least one application control rule and the new application control rule in executing one of the software applications; and receiving, by at least one of the plurality of computing devices, the new application control rule reconfigured with a lower priority to eliminate the at least one conflict.

In another example aspect, the information relating to software applications deployed on each computing device comprises application version information, unique application identifiers, digital signatures of each application, application manufacture information, application metadata, and application installation information.

In another example aspect, the information is associated with an identifier uniquely identifying each computing device in the network.

In another example aspect, each computing device transmits the information to test the new application control rule in response to a request, or on a periodic basis.

In another example aspect, the method further comprises transmitting, from each computing device, information relating to hardware configuration and the software applications deployed on each computing device upon launching each of the software application on each computing device.

In another example aspect, each of the one or more application control rules indicates metadata and a unique identifier of each application, a defined category of each application, a user identifier associated with each application, and a verdict of a type of restriction of each application.

In another example aspect, the type of restriction of each application indicates at least one of a direct blocking upon launching, a blocking of applications of a same category, or a blocking of a portion of an application function.

In another aspect, an example system for configuring application control rules, the system comprising: a hardware processor configured to: in response to testing a new application control rule, transmit, from each of a plurality of computing devices in a network, information relating to software applications deployed on each computing device and one or more application control rules including the new application control rule associated with the software applications, each of the one or more application control rules having a priority, the collected information identifying at least one conflict between at least one application control rule and the new application control rule in executing one of the software applications; and receive, by at least one of the plurality of computing devices, the new application control rule reconfigured with a lower priority to eliminate the at least one conflict.

In another aspect, an example a non-transitory computer-readable storage medium, having a computer program product stored thereon, comprises computer-executable instructions for configuring application control rules, including instructions for: in response to testing a new application control rule, transmitting, from each of a plurality of computing devices in a network, information relating to software applications deployed on each computing device and one or more application control rules including the new application control rule associated with the software applications, each of the one or more application control rules having a priority, the collected information identifying at least one conflict between at least one application control rule and the new application control rule in executing one of the software applications; and receiving, by at least one of the plurality of computing devices, the new application control rule reconfigured with a lower priority to eliminate the at least one conflict.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Example embodiments of the present invention are described herein in the event context of systems, methods and computer program products for configuring application control rules. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
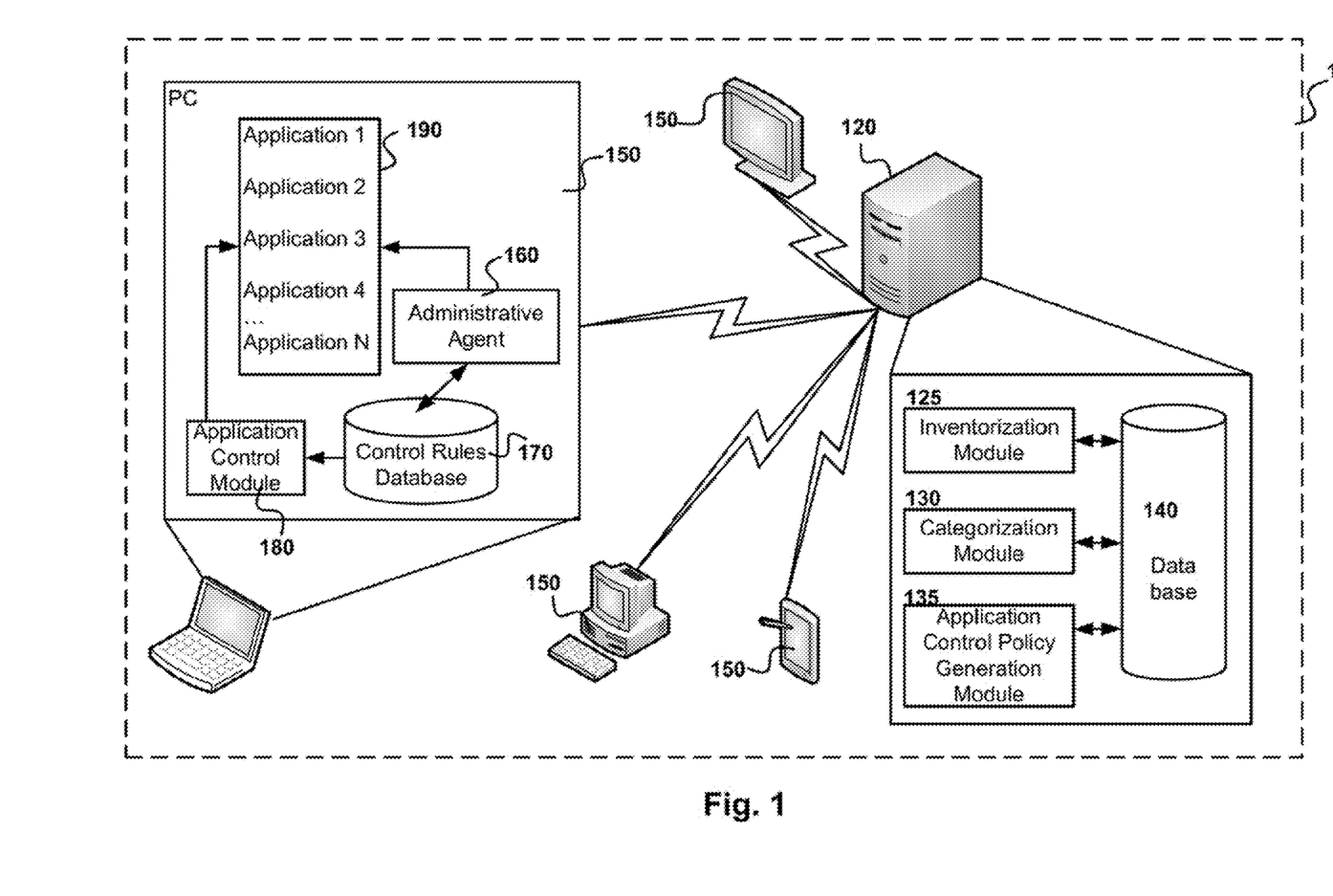
FIG. 1 illustrates an operating diagram of an example computer network that includes an administrative server that controls applications according to one aspect of the invention.

FIG. 1 shows the operating diagram of an example computer network that includes an administrative server that controls applications according to one aspect of the invention. A corporate network 110 (hereinafter, the network 110) generally consists of a multitude of PCs 150. The PC 150 can be, besides an actual personal computer, also any other device, such as a notebook or mobile device (such as a smartphone). In order to guarantee the security of the network 110, a remote control and monitoring is performed for said PCs 150 in the network 110, specifically, of the applications residing on all PCs 150 in the network 110. The remote administrative tasks of any give PC 150 are handled by the administrative server 120. The administrative server 120 may be also located in the network 110 and in one example implementation may be hosted on one of the PCs 150. Each PC 150 may include a security software (e.g., antivirus application), which performs various tasks of protection and control of applications on the PC 150. In one aspect, the security software may include an administrative agent 160, a database of control rules 170 and an application control module 180.

In one example aspect, the application control module 180 may control the running of the applications 190 by the users of the PCs 150. The control may be carried out by means of a list of application control rules that may be stored in the control rule database 170. The database 170 may contain at least one existing application control rule and may be periodically supplemented with new application control rules by the administrative agent 160, which is connected to the administrative server 120. The administrative agent 160 may also perform the task of collecting and sending the required information to the administrative server 120.

As was noted above, the administrative server 120 interacts with the security software that is installed on any given PC 150 through the administrative agent 160. Remote administrative tasks may include a broad spectrum of actions to be performed by the administrative server 120 on the PC 150. These actions may include, but not limited to, the updating of the antivirus databases and software modules, control of the security policies and group tasks on any of the PCs 150, remote installation of applications or updates on any of the PCs 150, performing software and hardware inventorization of any of the PCs 150. In one example aspect, in order to perform the application control tasks, the administrative server 120 may contain at least an inventorization module 125, a categorization module 130, an application control policy generation module 135 and a database 140.

In one example aspect, the database 140 is used by modules 125, 130 and 135 of the administrative server 120 to handle the tasks of application control on the PC 150 of the network 110. The database 140 may contain at least one of the following items of information:
- information about the applications 190 installed on the PC 150,
- information about the hardware configuration of each of the PCs 150,
- information about user accounts of the users of each PC 150,
- information about the role of each account record,
- rules for categorization of applications,
- rules for control of applications 190.

In one example aspect, the database 140 may be constantly updated with information provided by the inventory module 125. In a particular aspect, the database 140 can also be supplemented with information provided by the company providing the antivirus services.

In one example aspect, the inventorization module 125 allows the administrative server 120 to perform the remote inventory of each PC 150. During the inventory process, the inventory module 125 interacts with the administrative agents 160 of each PC 150. The inventory process involves collecting current information on at least every PC 150, on the applications 190 contained on each PC 150, and on the account records of the users making use of one or another PC 150. The information on each PC 150 may include at least information on the hardware configuration of each PC 150. The information about the applications 190 is at least the following: the application versions, the unique identifiers (e.g., hash sums) of the applications, the digital signatures of the applications, data about the manufacturers of the applications, the metadata of the applications and the ways in which the applications were installed. The type of information collected is provided as an example and is not exhaustive.

In one example aspect, the inventory process begins with the inventory module 125 of the administrative server 120 formulating a task to carry out an inventory and sending this task to all the administrative agents 160 on the PCs 150. The administrative agents 160 of each PC 150 then collect the necessary information and send it back to the inventory module 125. In turn, the inventory module 125 stores the collected information in the database 140, it should be noted that the set of data collected for each PC 150 has an identifier by which each of the aforesaid PCs 150 is unambiguously identified. This identifier can be, for example, the IP address, the MAC address, the serial number of the PC 150 or other such information.

In one example aspect, inventory process may be carried out on a periodic basis, making it possible to keep track of new applications installed on the PCs 150. This ensures that collected information about applications installed on PCs 150 is current.

Moreover, in one aspect, during the launching of any application on any PC 150 by any user, the administrative agent 160 can collect information on the given application and send it to the inventory module 125. After this, the inventory module 125 adds the information received to the database 140 and thereby updates the information about the applications 190.

The categorization module 130 allows the administrative server 120 to assign applications to defined categories of applications. As was described above, the database 140 can contain a list of categorization rules for the categorization of the applications 190 in accordance with the existing application categories. Each categorization rule corresponds to one type of category. The principle of formation of the categories can be based on different application criteria. Such criteria may include, but not limited to, the location of the application, the name of the application developer, the function of the application, metadata of the application and so on. Thus, for example, the rule for the name of the developer "Blizzard Entertainment" will assign the applications of this developer to the category of "Games". Another example of a categorization rule is the rule which brings together the applications or files of applications needed for the functioning of the operating system in the category "System Applications". Yet another example is the rule of categorization of applications 190 in the category "Browsers". This rule will add to this category applications 190, for example, with the name of the developer "Opera Software". The categorization module 130, using the rules of categorization for the information collected in the inventory process categorizes all the applications 190 that have been installed on each PC 150. The categorization module 130 then adds the information on the category assigned to each application 190 to the database 140 for later use, e.g., by the application control policy generation module 135.

In one example aspect, the categorization rules may be generated either automatically or by the network administrator. In automatic process, the categorization rules may be obtained from the remote storage of an antivirus company. If the administrator is working with the administrative server 120, the administrator can create, modify and save the categorization rules in the database 140. The administrator may also create his own custom application categories. For example, the administrator may use the categorization module 130 to create the category "Critical for operation" for the user accounts of the users, including in this category the familiar office applications (such as word processing applications, Web browsers, and graphics processing programs). Furthermore, the administrator may also categorize an application which for whatever reason did not fit into any given categorization rule.

In one aspect, the categorization module 130 may also perform filtering of the application categories for each PC 150. For example, the information about the application categories may be filtered and presented both in the context of the entire network 110 and for each individual PC 150.

In one example aspect, the application control policy creation module 135 allows the administrative server 120 to generate application start (launch) control policies for each user of any given PC 150 in the network 110. Generally, a control policy includes a list of application start control rules or at least one application start control rule. The application control rules determine whether to restrict or permit a user of any particular PC 150 to execute an application 190, certain function of an application 190 or a category of applications 190 on PC 150. These control rules may contain at least the following information:
- metadata (such as name, size, manufacturer) and/or a unique identifier (such as hash sums, digital signatures) of the application,
- the category of the application,
- the user's identifier (user's account record, role of the user's account record),
- the verdict on the type of restriction.

In one example aspect, the verdict on the type of restriction governs which applications are forbidden or permitted in the context of any particular category of applications for a particular account record of the user of the PC 150. Moreover, in the event of a prohibition, the verdict also governs the restrictions that should be placed on a particular application 190, on certain functions of the application or on any category of applications. As a restriction, it is possible to have either a direct blocking of the starting of the given application 190 or all applications of a particular category of applications, or the blocking of a particular function of an application 190. An example of the restricting of a function of an application 190 is the blocking of access of the application 190 to an external network, such as the Internet. Another example is the blocking of access to certain files which use the application 190.

It should be noted that a user account is created for each user in the network 110. Thus, it is possible to generate a list of application control rules for each user account. In this case, said list of control rules will work for each specific user account.

In one example aspect, the user accounts may be combined by means of roles, which allow classifying users of one or all PCs 150. Each role can be assigned a list of control rules that permits or forbids the use of particular applications on all the PCs 150. An example of a role is the role "accountant". Thus, the account record to which this role is assigned will be allowed to use only those applications on all PCs 150 in the network 110 that are governed for this role.

As noted above, application control rules may be generated either automatically or by the network administrator. In automatic implementation, the application control rules may be provided by the developer of antivirus programs not shown in FIG. 1), for example, by Kaspersky Lab. The administrative server 120 will then send these rules to the control rule databases 170 of each PC 150 for subsequent use by the application control module 180. If the control rules are formulated by the administrator, the administrator may use control rule templates to create application control rules. These templates may be based at least on application categories that were previously generated, for example, by the developer of antivirus programs. In creating the control rules, the administrator may also utilize the application control policy generation module 135. Thus, the administrator may create, for example, a control rule that will permit all users of all PCs 150 to launch applications falling within the category of "Applications required for operation". After creating the necessary control rules, the administrator may issue an order for the administrative server 120 to send said created control rules to the control databases 170 on PCs 150 and place them in operation.

In one aspect, the list of rules need not be sent to each PC 150, but instead a common database can be used to store all of the control rules, such as the database 140. Consequently, the application control module 180 may only determine an attempt to execute a particular application and send a request to the administrative server 120, where an analysis will be done on the basis of the list of control rules kept in the database 140. Metadata of the application or any unique identifier of the application being launched can be sent as a request.

Thus, in order to perform the application control tasks it may be desired to carry out an inventorization of the applications on each PC 150 of the network 110 and on the network 110 itself, to categorize the applications, and also to generate and apply application control rules for each user of each PC 150 in order to guarantee a secure working of all the users on all the PCs 150 and accomplish the administrative functions by the administrator of the network 110.

It should be noted that a certain degree of uncertainty exists when creating the list of application control rules automatically or by the administrator. In other words, instances of incorrect working of these application control rules are possible. This is due to the fact that, from time to time, it may be unclear which applications will fall into the application category being used and which applications are present on each PC 150. Hence, all these deficiencies in the working of the control rules will be remedied directly during the operation of said control rules, and this takes a substantial amount of time. The system described in FIG. 2 makes it possible to resolve these deficiencies even before the new application control rules are placed in operation, at the stage of creating the new application control rules.

Figure 2:
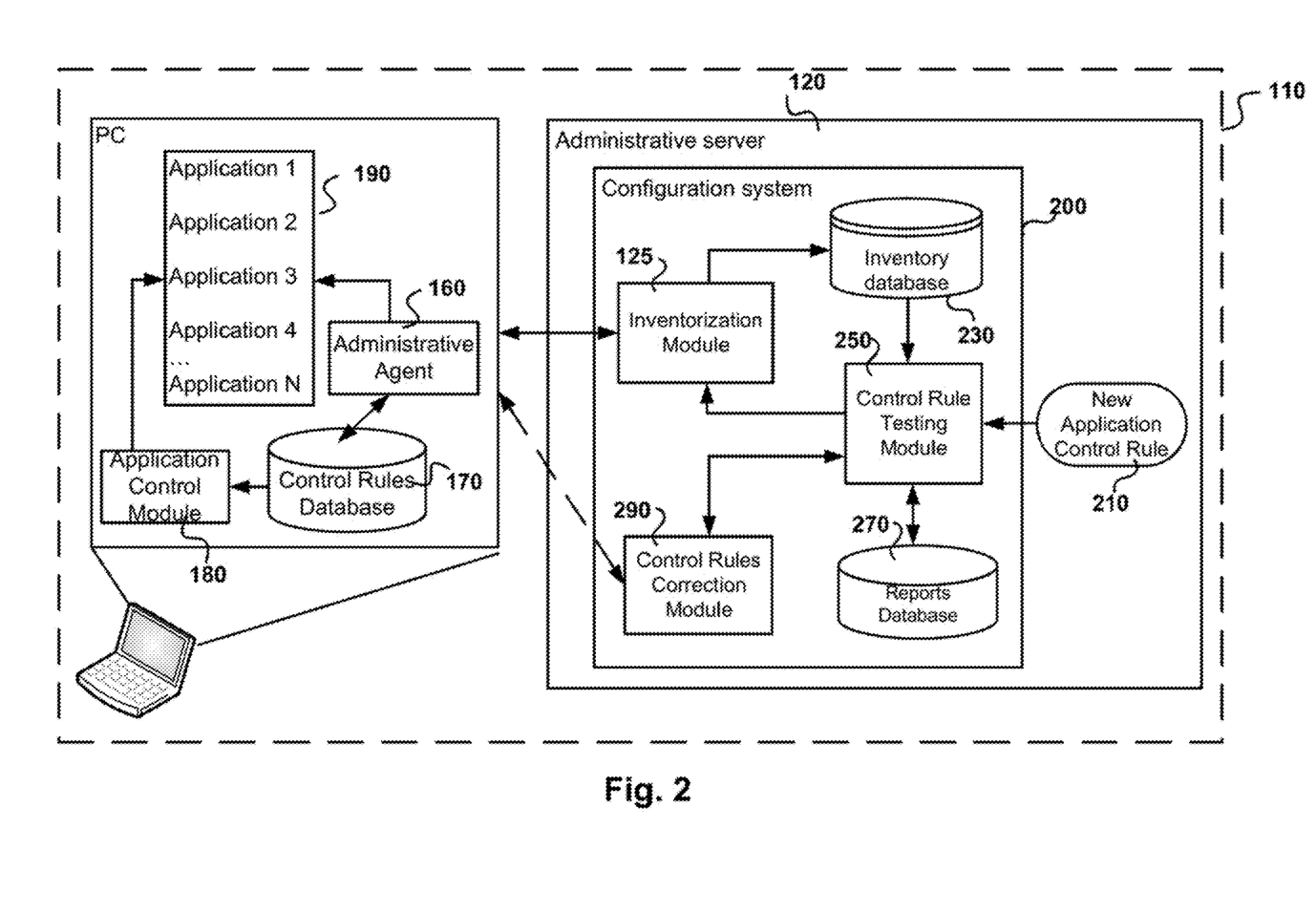
FIG. 2 illustrates an operating diagram of an example system for automatically configuring application control rules according to one aspect of the invention.

FIG. 2 shows an operating diagram of an example system for automatically configuring application control rules according to one aspect of the invention. The system for automatically configuring application control rules (hereinafter, the configuration system) 200 is designed to test at least one new application control rule for the presence of conflicts with existing application control rules and then fine-tune (i.e., reconfigure) the tested application control rule in the event that at least one conflict or working inaccuracy is found. The system 200 may be present in the network 110 and may include an auxiliary device for the administrative server 120 and may be generally used prior to placing new application control rules in operation.

In one example aspect, the configuration system 200 links together the inventory module 125, the inventory database 230, the control rule testing module 250, the reports database 270 and the control rule correction module 290. The configuration system 200 starts working upon the appearance of a new application control rule 210 or upon editing of an existing application control rule. Moreover, the configuration system 200 operates for generated categories of applications 190 and a number of existing application control rules that enable the working of all the users on all the PCs 150 in the network 110. Thus, after a new application control rule 210 is created, it is checked and fine-tuned (i.e., reconfigured), if necessary, by the control rule testing module 250 and control rule correction module 290.

In one example aspect, the control rule testing module 250 performs testing of the new application control rule 210 and then compares the results of the analysis with the working of the existing application control rules in order to identify conflicts in the working of the new application control rule 210. In one aspect, testing of a new application control rule 210 involves determining all verdicts which can be delivered by the new application control rule 210 upon starts (launch) of all applications on all PCs 150 in the network 110. Therefore, the module 250 may perform the testing of the application control rule 210 on the basis of current information at least on all PCs 150 and applications installed on at least one PC 150. During the testing, all possible verdicts may be identified that are delivered by the new application control rule 210 for the start of a particular application on any particular PC 150 by any particular user. For this, the module 250 makes a request to the inventory database 230 to collect current information on the applications contained in each PC 150 of the network 110, information about the categories assigned to each application, user accounts of the users on each PC 150, the roles assigned to each account record of the users, and existing application control rules. After this, the inventory database 230, which keeps current information on the network 110, on each PC 150 in the network 110 and on the applications installed on the PCs 150, sends the requested information to the control rule testing module 250. In one aspect, the functions of the inventory database 230 can be performed by the database 140 shown in FIG. 1.

It should be noted that, if there is no current information in the inventory database 230, the control rule testing module 250 may request the inventorization module 125 to perform an inventory. One example of the checking for current, status of information is the preliminary verification of the date of the last updating of the inventory database 230. The inventorization module 125 may collect the latest information and send this information to the inventory database 230, as was described in greater detail above with reference to FIG. 1.

Figure 3A:
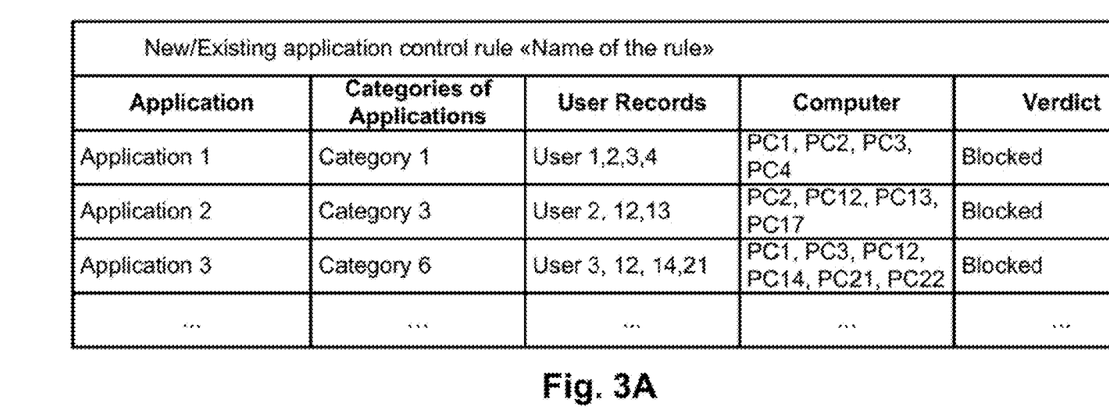
FIGS. 3A and 3B illustrate examples of the result of testing of an application control rule according to one aspect of the invention.
Figure 3B:
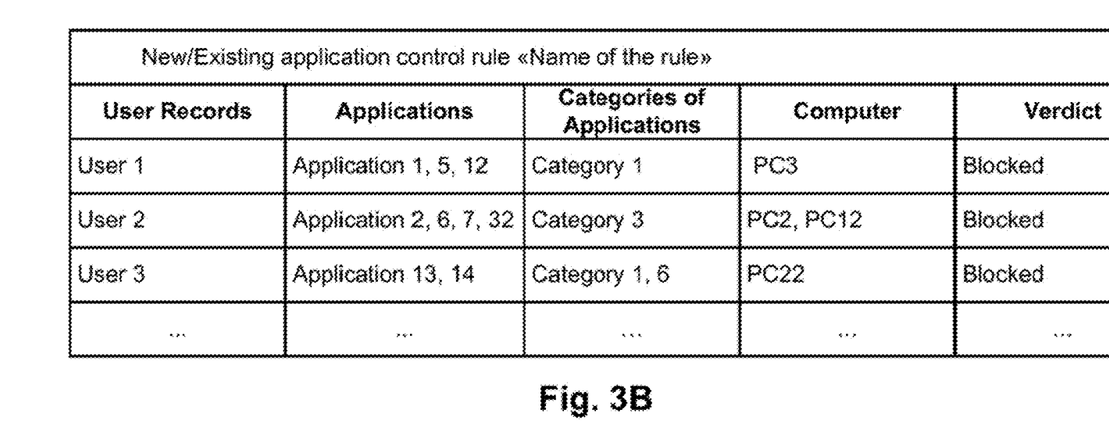

After receiving the current information, the control rule testing module 250 may perform testing of the new application control rule 210 and compile a report on the identified verdicts of this rule 210. Examples of a report are shown in FIGS. 3A and 3B. After this, the control rule testing module 250 may compare the report compiled on the verdicts delivered by the new application control rule 210 with the reports kept in the report database 270.

The report database 270 contains current reports on the working of each existing application control rule on all the PCs 150 in the network 110. It should be noted that each report was initially added to the report database 270 upon placing the corresponding control rule in operation. The current status of the information in the reports is maintained by a updating of the report data in accordance with the inventory that is performed. It should be noted that one kind of reports on the working of the existing application control rules can be a table containing entries with verdicts on the working of the application control rules.

Thus, a comparison of the reports identifies conflicts which may occur during working of the new application control rule 210 and any existing application control rule. One example of a conflict is the case when the new application control rule 210 forbids the launch of an application, while any existing application control rule permits the launch of this application. Yet another example of a conflict is the case when the new application control rule 210, which contains a verdict as to the blocking of applications assigned to the category of "Video players", for all users of all PCs 150, accordingly blocks these applications, but at the same time one of the existing application control rules permits the user account which is assigned the role of "Head of the security service" to start applications of the "Video players" category.

If at least one conflict is identified between the rule 210 and the existing application control rules or an inaccuracy is identified in the working of the new application control rule 210, the control rule testing module 250 may request reconfiguration for fine-tuning) of the new rule 210 and sends this request to the control rule correction module 290.

In one example aspect, the control rule correction module 290 corrects the new application control rule 210 in accordance with the at least one identified conflict or working inaccuracy. In the event of determining a working inaccuracy of the new control rule 210, the module 290 may make changes that eliminate identified inaccuracies. For example, if the inaccuracy involves the blocking of an application for a user who should be permitted to launch that application, an exception can be made to the new control rule 210 that will allow that user to launch the corresponding application. In other words, the rule will not forbid the execution of the application to the user who has been included in the exception to the rule.

In the event of finding a conflict, the module 290 may determine the priority between the new control rule 210 and the existing control rule. After this, depending on the priority of the rules, the module 290 may reconfigure the new control rule 210 or the existing control rule.

In one aspect, the priority of the rules may be determined as follows: at the stage of creating the application control rules, a priority is assigned to each application control rule. The value of the assigned priority can range from zero to infinity, and the higher the value, the higher the priority. Consequently, the module 290 may compare the priorities of the application control rules and gives priority to the corresponding application control rule. If the priority is higher for the existing control rule, the new control rule 210 will be reconfigured in accordance with the conflict. Otherwise, if the priority is lower for the existing control rule, the existing control rule will be reconfigured in accordance with the conflict. Then the new reconfigured application control rule 210 will be placed in operation, for example, by adding it to the corresponding control rule databases 170 on the PCs 150.

In another aspect, the priority of the rules may be determined in accordance with the following condition: a forbidding rule (a "Deny" rule) will always have a higher priority than a permitting rule (an "Allow" rule).

Figure 4:
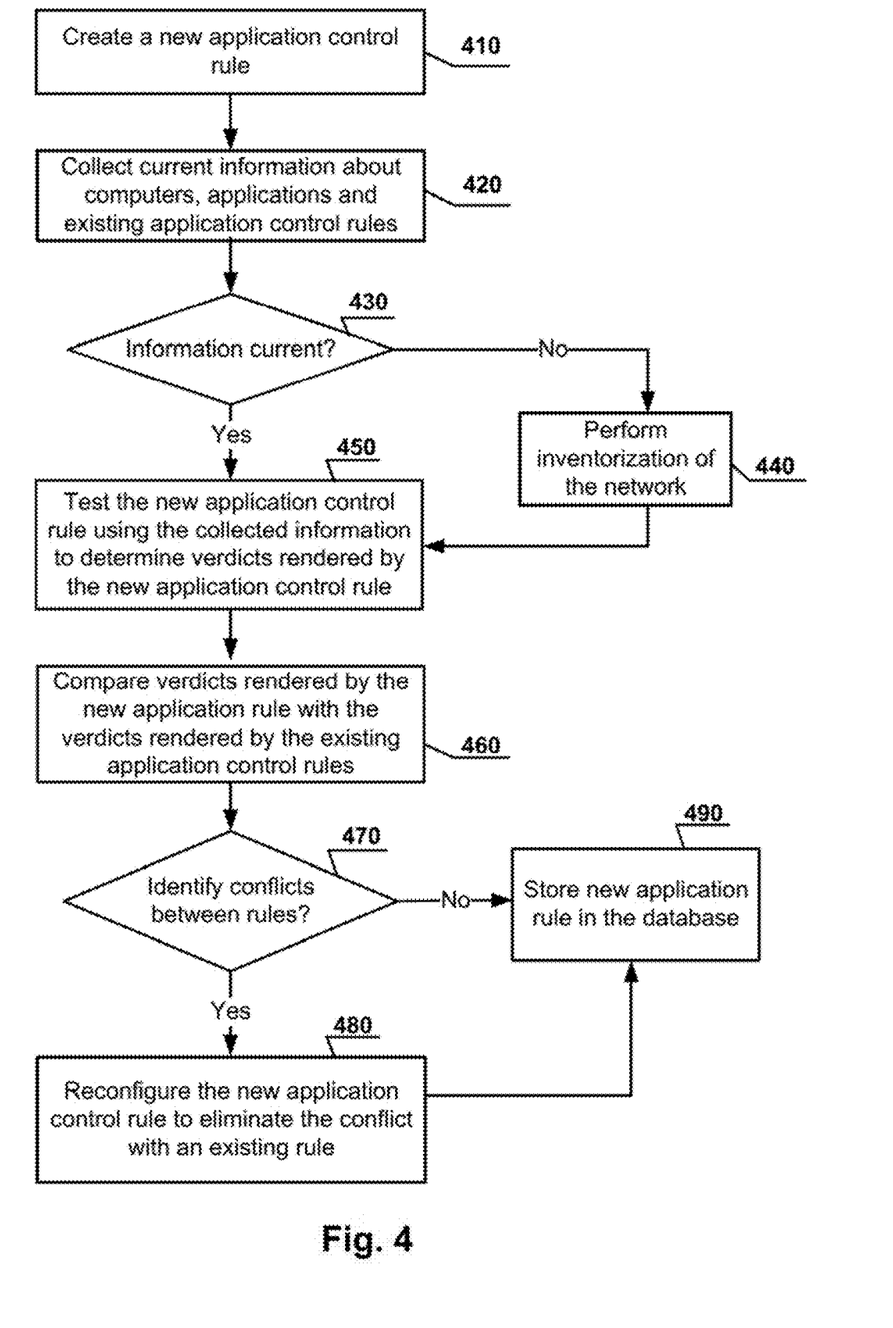
FIG. 4 illustrates an operating algorithm of the example system for configuring application control rules according to one aspect of the invention.

FIG. 4 an operating algorithm of the example system for configuring application control rules according to one aspect of the invention. In step 410, a new application control rule 210 is created and sent to the configuration system 200 for testing its operating accuracy. The new control rule 210 can be created either automatically or by the administrator. Moreover, it is possible to send the configuration system 200 not just one new rule 210, but a whole list of application control rules. In this case, the configuration system 200 can perform testing of the application control rules from the list of application control rules both individually and jointly.

The testing of the one or more new control rules may be done by means of the control rule testing module 250. In order to perform the testing of the control rule 210, the testing module 250, in step 420, may collect current information about at least existing application control rules as well as information about every PC 150 and on each application installed on each PC 150 from the inventory database 230. In step 430, the current status is checked for the information contained in the inventory database 230. The check involves verifying the date of the last update of the inventory database 230. If the date of the last update is current, then the information from the database 230 is presented to the testing module 250. Otherwise, if the date of the last update is not current, the testing module 250 may request the inventorization module 125 to perform an inventory, which will be done in step 440. The inventory involves collecting current information on the PCs 150, where the information contains at least the following items:

- information on the user accounts,
- information on the PCs where said user accounts are being used,
- information on the applications installed on these PCs,
- information on the categories of these applications.

After performing the inventory, the inventorization module 125 adds the current information to the inventory database 230 and changes the date of the last update. After this, the current information is sent to the testing module 250. In step 450, the testing module 250 tests the new application control rule on the basis of the current information received. Based on the test, a report is compiled that contains the verdicts delivered by the control rule 210. Each verdict shows the existence of a blocking or a permitting of the starting of a particular application 190 for a particular user of each PC 150. In other words, the working of the control rule 210 during the launch of each application 190 by each user on each PC 150 is tested. In one aspect, the report may also contain the following information about:

- the applications that will be blocked by said control rule 210 if the control placed in operation, and their categories,
- the user accounts and/or the roles of the user accounts for which the applications were blocked,
- the PCs on which the starting of the applications will be blocked if the control rule placed in operation.

Then, in step 460, the testing module 250 makes a comparison of the analysis results with the information on the existing application control rules. The comparison is based on the report compiled for the verdicts delivered by the new control rule 210 and the information contained in the report database 270. For this, the report database 270 provides said information to the testing module 250. It should be noted that the information from the report database 270 contains at least reports on the working of all existing application control rules. In step 470, the testing module 250 determines the presence of conflicts in the working of the control rule 210 during its interaction with the existing application control rules. In one example, conflicts may include contradiction between the new control rule 210 and any existing application control rule. One example of a contradiction is the case when the control rule 210 has blocked the launching of an application assigned to the category "Graphics" for all users of all PCs 150. Yet one of the existing application control rules allows the launching of applications assigned to the category "Graphics" for users with the role "Design engineer".

If at least one conflict is identified, the control rule 210 is sent to the control rule correction module 290 for subsequent reconfiguration (i.e., fine-tuning) in step 480. In step 480, a reconfiguration of the control rule 210 is done in accordance with the conflict identified. The reconfiguration can be, for example, a configuring the control rule 210 by means of adding the application that was blocked to the exclusions for the working of the given control rule 210. The regulated control rule 210 is then placed in operation in step 490. If no conflicts were identified, step 480 may be skipped and the control rule 210 is placed in operation in step 490.

In one example aspect, in step 480, instead of reconfiguring the control rule 210 there can occur a reconfiguration of at least one existing application control rule. This is due to the fact that the new control rule 210 might be a more important rule than the existing application control rule. In this case, all the control rules may have a priority level. The priority level may be assigned either by the administrator or automatically in accordance with "default" mode. In the case of automatic mode, priority may be assigned to the control rules in accordance with the following condition: forbidding rules will always have higher priority than permitting rules.

Consequently, depending on the priority level, the control rule correction module 290 may make a decision to regulate the new control rule 210 or the existing application control rule, if a decision is made to regulate the existing application control rule, this control rule may be regulated by means of adding to it an exception corresponding to the conflict identified. For example, if the existing application control rule permitted the starting of an application that is forbidden by the new control rule 210, this application will be added to the exceptions to the existing rule and, consequently, it will not fall under the action of that existing control rule.

Figure 5:
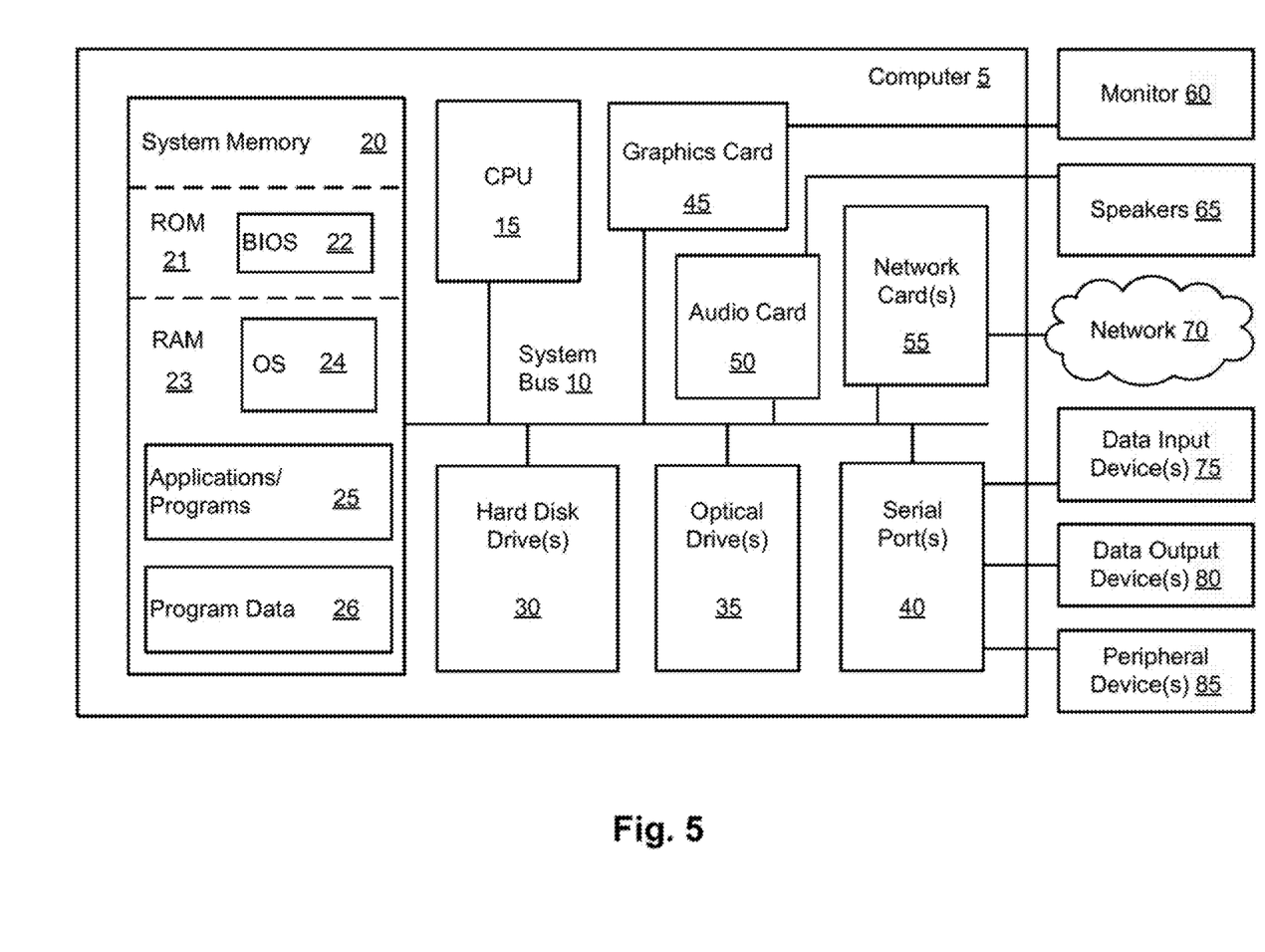
FIG. 5 illustrates an example of a general-purpose computer system on which the systems and methods for configuring application control rules may be implemented.

FIG. 5 depicts an example configuration of a general-purpose computer system 5 that can be used to implement the disclosed systems and methods for testing and configuring application control rules according to according to one aspect of the invention. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be, any of several types of bus structures including a memory bus or memory controller, a peripheral bus and a local bus using any of a variety of known bus architectures. Processor 15 may include one or more Inter® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for configuring application control rules, comprising:
   installing security software on a plurality of computing devices in a network, wherein the security software is configured to control execution of applications on the computing devices using a plurality of application control rules, each computing device being associated with one or more user accounts, each user account having a first unique identifier, and each application having a second unique identifier;
   during launching of at least one application on at least one of the plurality of computing devices for testing a new application control rule, transmitting, by the security software from each of the plurality of computing devices in the network, to an administrative server, information relating to one or more user account records and software applications deployed on each computing device for the identification and resolution of conflicts between the new application control rule and one or more existing application control rules, wherein the one or more existing application control rules comprise information linking at least one or more applications each having the second unique identifier with each user account having the first unique identifier, and the conflict is resolved by assigning different priorities to the conflicting rules;
   based at least upon the second unique identifier corresponding to the at least one application launched, receiving from the administrative server, by the security software on the at least one of the plurality of computing devices, an application control rule reconfigured with a lower or higher priority than one or more conflicting application control rules to eliminate a conflict between the new application control rule and the one or more existing application control rules; and
   applying, by the security software, the one or more application control rules to the applications on the computing devices based on the priorities of said application control rules.

2. The method of claim 1, wherein the information relating to software applications deployed on each computing device comprises application version information, unique application identifiers, digital signatures of each application, application manufacturer information, application metadata, and application installation information.

3. The method of claim 1, wherein the information is associated with an identifier uniquely identifying each computing device in the network.

4. The method of claim 1, wherein each computing device transmits the information to test the one or more application control rules in response to a request, or on a periodic basis.

5. The method of claim 1, further comprising transmitting, from each computing device, information relating to hardware configuration and the software applications deployed on each computing device upon launching each of the software application on each computing device.

6. The method of claim 1, wherein each of the one or more application control rules indicates metadata and a unique identifier of each application, a defined category of each application, a user identifier associated with each application, and a verdict of a type of restriction of each application.

7. The method of claim 6, wherein the type of restriction of each application indicates at least one of a direct blocking upon launching, a blocking of applications of a same category, or a blocking of a portion of an application function.

8. A system for configuring application control rules, the system comprising:
a hardware processor configured to:
install security software on a plurality of computing devices in a network, wherein the security software is configured to control execution of applications on the computing devices using a plurality of application control rules, each computing device being associated with one or more user accounts, each user account having a first unique identifier, and each application having a second unique identifier;
during launching of at least one application on at least one of the plurality of computing devices for testing a new application control rule, transmit, by the security software from each of the plurality of computing devices in the network, to an administrative server, information relating to one or more user account records and software applications deployed on each computing device for the identification and resolution of conflicts between the new application control rule and one or more existing application control rules, wherein the one or more existing application control rules comprise information linking at least one or more applications each having the second unique identifier with each user account having the first unique identifier, and the conflict is resolved by assigning different priorities to the conflicting rules;
based at least upon the second unique identifier corresponding to the at least one application launched, receive from the administrative server, by the security software on the at least one of the plurality of computing devices, an application control rule reconfigured with a lower or higher priority than one or more conflicting application control rules to eliminate a conflict between the new application control rule and the one or more existing application control rules; and
apply, by the security software, the one or more application control rules to the applications on the computing devices based on the priorities of said application control rules.

9. The system of claim 8, wherein the information relating to software applications deployed on each computing device comprises application version information, unique application identifiers, digital signatures of each application, application manufacturer information, application metadata, and application installation information.

10. The system of claim 8, wherein the information is associated with an identifier uniquely identifying each computing device in the network.

11. The system of claim 8, wherein each computing device transmits the information to test the one or more application control rules in response to a request, or on a periodic basis.

12. The system of claim 8, wherein the processor is further configured to transmit, from each computing device, information relating to hardware configuration and the software applications deployed on each computing device upon launching each of the software application on each computing device.

13. The system of claim 8, wherein each of the one or more application control rules indicates metadata and a unique identifier of each application, a defined category of each application, a user identifier associated with each application, and a verdict of a type of restriction of each application.

14. The system of claim 13, wherein the type of restriction of each application indicates at least one of a direct blocking upon launching, a blocking of applications of a same category, or a blocking of a portion of an application function.

15. A non-transitory computer-readable storage medium having a computer program product stored thereon, the computer-readable storage medium comprising computer-executable instructions for configuring application control rules, the instructions comprising:
installing security software on a plurality of computing devices in a network, wherein the security software is configured to control execution of applications on the computing devices using a plurality of application control rules, each computing device being associated with one or more user accounts, each user account having a first unique identifier, and each application having a second unique identifier;
during launching of at least one application on at least one of the plurality of computing devices for testing a new application control rule, transmitting, by the security software from each of the plurality of computing devices in the network, to an administrative server, information relating to one or more user account records and software applications deployed on each computing device for the identification and resolution of conflicts between the new application control rule and one or more existing application control rules, wherein the one or more existing application control rules comprise information linking at least one or more applications each having the second unique identifier with each user account having the first unique identifier, and the conflict is resolved by assigning different priorities to the conflicting rules;
based at least upon the second unique identifier corresponding to the at least one application launched, receiving from the administrative server, by the security software on the at least one of the plurality of computing devices, an application control rule reconfigured with a lower or higher priority than one or more conflicting application control rules to eliminate a conflict between the new application control rule and the one or more existing application control rules; and
applying, by the security software, the one or more application control rules to the applications on the computing devices based on the priorities of said application control rules.

16. The computer-readable storage medium of claim 15, wherein the information relating to software applications deployed on each computing device comprises application version information, unique application identifiers, digital signatures of each application, application manufacturer information, application metadata, and application installation information.

17. The computer-readable storage medium of claim 15, wherein the information is associated with an identifier uniquely identifying each computing device in the network.

18. The computer-readable storage medium of claim 15, wherein each computing device transmits the information to test the one or more application control rules in response to a request, or on a periodic basis.

19. The computer-readable storage medium of claim 15, further comprising transmitting, from each computing device, information relating to hardware configuration and the software applications deployed on each computing device upon launching each of the software application on each computing device.

20. The computer-readable storage medium of claim 15, wherein each of the one or more application control rules indicates metadata and a unique identifier of each application, a defined category of each application, a user identifier associated with each application, and a verdict of a type of restriction of each application, wherein the type of restriction of each application indicates at least one of a direct blocking upon launching, a blocking of applications of a same category, or a blocking of a portion of an application function.

\* \* \* \* \*